(12) United States Patent
Rajaraman et al.

(10) Patent No.: US 9,183,270 B2
(45) Date of Patent: Nov. 10, 2015

(54) SOCIAL GENOME

(75) Inventors: Anand Rajaraman, Palo Alto, CA (US); Madhusudan Mathihalli, San Bruno, CA (US); Arvind Batra, San Bruno, CA (US); Digvijay Singh Lamba, San Bruno, CA (US); Taraka Subrahmanya Prasad Siripurapu, San Bruno, CA (US); Nikesh Garera, San Bruno, CA (US)

(73) Assignee: Wal-Mart Stores, Inc., Bentonville, AK (US)

( * ) Notice: Subject to any disclaimer, the term of this patent is extended or adjusted under 35 U.S.C. 154(b) by 92 days.

(21) Appl. No.: 13/300,519

(22) Filed: Nov. 18, 2011

(65) Prior Publication Data

US 2012/0131047 A1  May 24, 2012

Related U.S. Application Data

(60) Provisional application No. 61/415,279, filed on Nov. 18, 2010, provisional application No. 61/415,282, filed on Nov. 18, 2010.

(51) Int. Cl.
*G06F 17/30* (2006.01)
*G06Q 30/06* (2012.01)

(52) U.S. Cl.
CPC ...... *G06F 17/30592* (2013.01); *G06Q 30/0631* (2013.01); *G06F 17/30604* (2013.01); *G06F 17/30734* (2013.01); *G06F 17/30864* (2013.01)

(58) Field of Classification Search
CPC ........... G06Q 50/01; H04N 2201/0039; G06F 17/30864; G06F 17/30592; G06F 17/30604; G06F 17/30734

USPC .................................. 707/769, 797, 798, 791
See application file for complete search history.

(56) References Cited

U.S. PATENT DOCUMENTS

| | | | |
|---|---|---|---|
| 8,533,236 B1 * | 9/2013 | Baluja et al. .................. | 707/802 |
| 8,606,721 B1 * | 12/2013 | Dicker .......................... | 705/319 |
| 8,892,605 B2 * | 11/2014 | Wilson et al. ................. | 707/798 |
| 8,918,418 B2 * | 12/2014 | Lee et al. ...................... | 707/767 |
| 8,930,204 B1 * | 1/2015 | Igoe et al. ......................... | 705/2 |
| 8,943,154 B1 * | 1/2015 | Bodell et al. ................. | 709/206 |
| 8,949,250 B1 * | 2/2015 | Garg et al. .................... | 707/748 |
| 9,002,898 B2 * | 4/2015 | Narayanan et al. ........... | 707/798 |
| 2004/0167909 A1 | 8/2004 | Wakefield et al. | |
| 2006/0173957 A1 * | 8/2006 | Robinson et al. ............. | 709/204 |
| 2007/0214097 A1 * | 9/2007 | Parsons et al. .................. | 706/12 |
| 2008/0091656 A1 * | 4/2008 | Charnock et al. ................ | 707/3 |
| 2008/0133581 A1 * | 6/2008 | MacVarish .................... | 707/102 |

(Continued)

OTHER PUBLICATIONS

Snowsill, Tristan, et al., "Finding Surprising Patterns in Textual Data Streams", Cognitive Information Processing (CIP), 2010 2nd International Workshop on, IEEE, Piscataway, NJ, dated Jun. 14, 2010.

(Continued)

*Primary Examiner* — Thanh-Ha Dang
(74) *Attorney, Agent, or Firm* — Bryan Cave LLP (57) ABSTRACT

Systems and methods are provided for processing a data stream in real time to identify connections between one or more social elements social elements and aggregating and storing the identified connections over a rolling time window. Social elements may be stored as nodes and connection between social elements may be stored as labeled connections between nodes.

21 Claims, 8 Drawing Sheets

(56) References Cited

U.S. PATENT DOCUMENTS

| | | | |
|---|---|---|---|
| 2008/0215607 A1* | 9/2008 | Kaushansky et al. | 707/102 |
| 2009/0182779 A1 | 7/2009 | Johnson | |
| 2009/0327484 A1* | 12/2009 | Chen et al. | 709/224 |
| 2010/0121707 A1* | 5/2010 | Goeldi | 705/14.49 |
| 2010/0121849 A1* | 5/2010 | Goeldi | 707/736 |
| 2010/0198777 A1 | 8/2010 | Lo et al. | |
| 2010/0306249 A1* | 12/2010 | Hill et al. | 707/769 |
| 2011/0004692 A1* | 1/2011 | Occhino et al. | 709/228 |
| 2011/0137932 A1* | 6/2011 | Wable | 707/769 |
| 2011/0161827 A1* | 6/2011 | Dedis et al. | 715/738 |
| 2011/0246463 A1* | 10/2011 | Carson et al. | 707/737 |
| 2011/0246574 A1* | 10/2011 | Lento et al. | 709/204 |
| 2011/0265011 A1* | 10/2011 | Taylor et al. | 715/751 |
| 2011/0282860 A1* | 11/2011 | Baarman et al. | 707/709 |
| 2012/0001919 A1* | 1/2012 | Lumer | 345/440 |
| 2012/0011202 A1* | 1/2012 | Occhino et al. | 709/204 |
| 2012/0016661 A1* | 1/2012 | Pinkas | 704/9 |
| 2012/0047219 A1* | 2/2012 | Feng et al. | 709/207 |
| 2012/0054205 A1* | 3/2012 | Baluja et al. | 707/749 |
| 2012/0054275 A1* | 3/2012 | Channell | 709/204 |
| 2012/0203831 A1* | 8/2012 | Schoen et al. | 709/204 |
| 2013/0191416 A1* | 7/2013 | Lee et al. | 707/771 |

OTHER PUBLICATIONS

International Search Report issued in International Application No. PCT/US2011/061547, dated Mar. 6, 2012 (5 pages).

* cited by examiner

BenFranklin1982 Heads up, Djokovic v Federer is going to a 5th set! #USOpen
half a minute ago via TweetDeck

Figure 1a dejifasusi SALT is fantastic! Angelina Jolie is angelic! Goodness me! Her poise, gait & mastery of her role is astonishing.
about 1 hour ago via UberTwitter

Figure 1b marizipan I just became the mayor of Via Mode on @foursquare! http://4sq.com/dq8s3k
less than 20 seconds ago via foursquare

Figure 1c mikalgilmore Hasn't this always been the case? NYTimes: Tax Cuts May Prove Better for Politicians Than for Economy http://nyti.ms/d93MKm
5 minutes ago via NYT Editors' Choice

SOCIAL GENOME

CROSS-REFERENCE TO RELATED APPLICATIONS

The present application claims priority to U.S. Provisional Application No. 61/415,279, filed Nov. 18, 2010, entitled "Social Genome," and U.S. Provisional Application No. 61/415,282, filed Nov. 18, 2010, entitled "Managing Real-Time Data Streams." This application also relates to U.S. Provisional Patent Application No. 61/345,252, filed May 17, 2010, entitled "Content Feed," U.S. patent application Ser. No. 13/106,706, filed May 12, 2011, entitled "Processing Data feeds," U.S. Non-Provisional application Ser. No. 13/300,473, filed Nov. 18, 2011, entitled "Methods Systems and Devices for Recommending Products and Services," and U.S. Non-Provisional patent application Ser. No. 13/300,523, filed Nov. 18, 2011, entitled "Real-Time Analytics of Streaming Data." The entire contents of each of the above-referenced applications are incorporated herein in their entirety by reference.

BACKGROUND

In recent years, social media services such as Twitter™, Digg™, Myspace™ and Facebook™ have seen a meteoric rise in popularity resulting in an ever evolving universe of streaming content/data which is often user/consumer generated. Thus, social media is able to capture, better than many other sources, a raw and unfiltered pulse of society.

Potential applications for data harvested from social media are vast. For example, from a marketing intelligence standpoint, a company may gather and analyze information relevant to the company's markets to promote accurate and confident decision-making in determining market opportunity, market penetration strategy, market development metrics, etc.

TECHNICAL FIELD

The present disclosure relates systems and methods for processing and analyzing data streams over time. More particularly, the present disclosure relates to systems and methods for extracted and aggregating and storing relevant data from data streams.

SUMMARY

Systems, data structures and methods are provided herein for capturing information from a data stream, for example in real time.

In exemplary embodiments, a system may include a processor for analyzing a data stream and identifying connections between social elements in a data stream; and memory for aggregating and storing the identified social elements and connections over a rolling time window. The system may further include a semantic analysis engine for identifying social elements in the one or more data streams and for contextually analyzing the identified social elements to identify connections between social elements. In some embodiments, the system may include an application program interface enabling querying of the stored social elements and connections. In other embodiments, the system may include a distributed processing platform for real-time distributed processing of the one or more data streams.

In other exemplary embodiments, a system for analyzing social information may include a data structure, for capturing and aggregating social information, the data structure having a plurality of stored nodes representing social elements including at least a first node representing a first type of social element and a second node representing at least a second type of social element; and a plurality of stored connections between nodes representing contextual connections between social elements; and an interface for querying of the stored social elements and connections. In some embodiments, the interface may be used to display a labeled edge multi-graph representing the data structure. In other embodiments, the interface may be used to query the data structure for connections related to a particular instance of a social element. In some embodiments, the interface is used to display an instance-centric view of a multigraph.

In exemplary embodiments a data structure, for capturing and aggregating social information from streaming data, may include a plurality of stored nodes representing social elements identified in the data streams over a rolling time window; and a plurality of stored connections between the nodes representing connections between the identified social elements over the rolling time window. The identified social elements may include, for example, one or more of (i) people, (ii) places, (iii) things, (iv) media, (v) events, (vi) and products. Similarly, the identified connections include one or more of, for example (i) a symmetric relationship (ii) an asymmetric relationship, (iii) an affinity rating, (iv) an authority ratings, and (v) an interest rating.

In further exemplary embodiments, a data structure, for capturing and aggregating social information, may include a plurality of stored nodes representing social elements including at least a first node representing a first type of social element and a second node representing at least a second type of social element; and a plurality of stored connections between nodes representing connections between social elements.

In exemplary embodiments, a method for capturing data from a data stream may include processing a data stream in real time to identify connections between one or more social elements; and aggregating and storing the identified connections over a rolling time window. In some embodiments, the method may further include querying the data for connections related to a particular instance of a social element. In other embodiments the method may further include displaying an instance-centric view of a multigraph for a particular instance of a social element.

The foregoing and other objects, aspects, features and advantages of exemplary embodiments will be more fully understood from the following description when read together with the accompanying drawings.

DETAILED DESCRIPTION

The present disclosure relates to systems and methods for capturing information from a data stream. It is appreciated that, while exemplary embodiments presented herein relate to analysis of social media feeds, the systems and methods of the present disclosure may be used for analysis of any type of streaming data, structured or unstructured. For instance the systems and methods of the present disclosure may be used for real-time analysis of purchase transactions, customer reviews/feedback, customer wish lists/shopping carts, etc.

As used herein the term post may refer to an atomic unit in a data stream. For example, a single tweet in a Twitter™ feed or a single purchasing transaction in a transaction stream may be considered a post. Contributing a post to a data stream may be referred to as posting to the data stream. According to the present disclosure, posts may be processed/analyzed to identify of one or more connections between social elements.

Figure 1A:
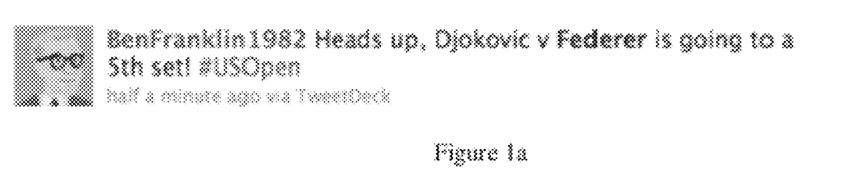
FIG. 1a depicts a first exemplary unstructured data post embodying exemplary connections between social elements contained therein, according to the present disclosure.
Figure 1B:
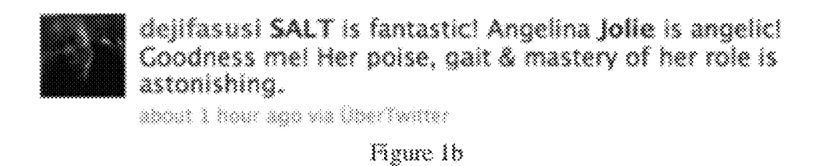
FIG. 1b depicts a second exemplary unstructured data post embodying exemplary connections between social elements contained therein, according to the present disclosure.
Figure 1C:
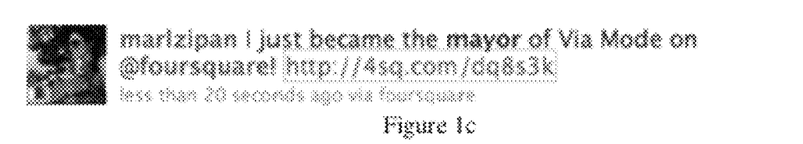
FIG. 1c depicts a third exemplary unstructured data post embodying exemplary connections between social elements contained therein, according to the present disclosure.
Figure 1D:
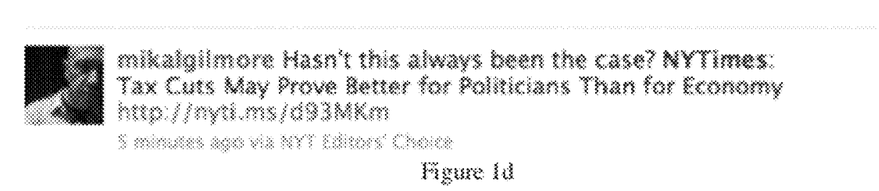
FIG. 1d depicts a fourth exemplary unstructured data post embodying exemplary connections between social elements contained therein, according to the present disclosure.

FIGS. 1a-1d illustrate exemplary unstructured data posts embodying connections between various social elements. For example, FIG. 1a illustrates an exemplary post embodying connections between people (BenFranklin1982, Djokovik and Federer) and an event (US Open Tennis 2010 Semifinal). Note that, labels may be used to further characterize the embodied connections. For example, whereas Federer's connection to the U.S. Open may be aptly characterized as that of a player/participant, BenFranklin1982's connection may be better characterized as that of a fan. FIG. 1b illustrates an exemplary post establishing connections between a person (dejifasusi), a movie (Salt), and an actress (Angelina Jolie). Once again labels may be used to further characterize the embodied connections. Thus, for example, dejifaususi's connection to both Salt and Angelina Jolie may be characterized as a positive sentiment. FIG. 1c illustrates an exemplary post establishing an employment connection between a person (marlzipan) and a place (Via Mode) further characterized by the title mayor. The post of FIG. 1c also establishes a connection marlzipan and a 4square, presumably for the same person. Finally, FIG. 1d illustrates, inter alia, an exemplary post establishes a connection between a person (mikalgilmore) and media (URL link to a New York Times web page/article) as well as a negative sentiment for both regarding a topic (tax cuts).

Systems and methods are presented herein for extracting, aggregating and storing connections embodied in data streams, for example, connections such as noted above with respect to FIGS. 1a-d. The aggregation of connections over a rolling time may advantageously provide an evolving snapshot of society, where expiring and/or older connections are dropped and new connections are added in real-time.

Figure 2:
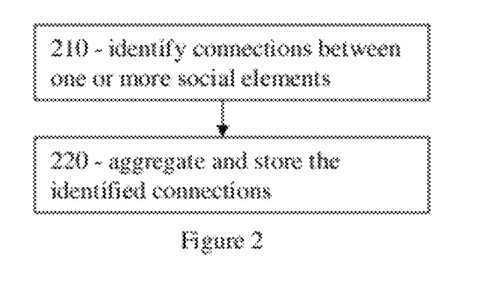
FIG. 2 illustrates an exemplary method for capturing data from a data stream, according to the present disclosure.

With reference to FIG. 2, an exemplary method 200 for capturing data from a data stream is depicted. The method 200 generally includes steps of (210) processing a data stream in real time to identify connections between one or more social elements and (210) aggregating and storing the identified connections over a rolling time window. Exemplary systems and methods for processing data streams are further described herein as well as in U.S. non-provisional patent application Ser. No. 13/300,524, entitled "Processing Data Feeds," filed Nov. 18, 2011.

Social elements, as used herein, generally include people, places and things although these general categories may often be divided to include one or more hierarchical subsets thereof. For example, the general category things may include hierarchical subsets such as topics (i.e., movies, bands, sports, teams, hobbies, etc.), products, media, events, etc. At its simplest, a social element may be characterized by one or more labels, for example, a person, place or thing may be characterized by a name. In some embodiments, each type of social element tracked may be characterized by a unique data structure of one or more dimensions for that type of social element. For example, a person may be characterized by, a name, gender, age, etc. Some types of social elements discussed herein may carry special meaning. For example, media as described herein may be characterized, inter alia, by a link or attachment of some shareable media asset and events may be characterized, inter alia, by a time window, for example, a date for the event.

Connections, as used herein, represent any type of relationship between social elements. Thus, in exemplary embodiments, connections may be symmetric (for example mutual friends) or asymmetric (for example, a fan of a sports team). In some embodiments, connections may include a value components, for example, to rate an affinity level (for example, like, dislike or neutral), authority level (for example, expert vs. novice), interest level (for example, scale of 1-100), etc. Each value component may be associated with a value function defining how that value component is computed.

In exemplary embodiments, the aggregated data is stored as a plurality of labeled connections between nodes, wherein each node represents an instance of a social element. In exemplary embodiments each node and each connection may be characterized by one or more attribute-value pairs. For example, a node for a person may be characterized by a set of values for attributes such as name, age, gender, etc. In exemplary embodiments, the stored data may be represented as multi-graph with nodes representing instances of social elements and labeled edges representing connections. The multi-graph may be displayed for viewing thereof by a user. In exemplary embodiments, a user interface may enable manipulation of the multi-graph to allow for selection of particular views thereof, for example a zoom view for viewing and analyzing connections/social elements related to a particular instance of a social element.

In exemplary embodiments, an application program interface (API) may be included for accessing the stored data. More particularly, the API may be configured to provide access, for example to related programs, users, or other interested parties, for querying the stored data. For example, the API could be configured to accept a query input including an identification of a place and receive back stored connections to the place or accept a URL related to a media asset and return all positive affinity connection thereto. Note that the foregoing exemplary queries are non-limiting. Indeed, queries may be formulated based on any of the parameters (i.e., attribute-value pairs) reflected in the data structure, including but not limited to authority, popularly, affinity, etc. It will be appreciated that queries may be utilized to facilitate marketing analytics for a product, for example, based on users interest/affinity thereto. Queries may also be used for general or targeted marketing intelligence. For example, the interests of society in general or of a user specifically may be determined to inform marketing strategies with regards thereto.

Figure 3:
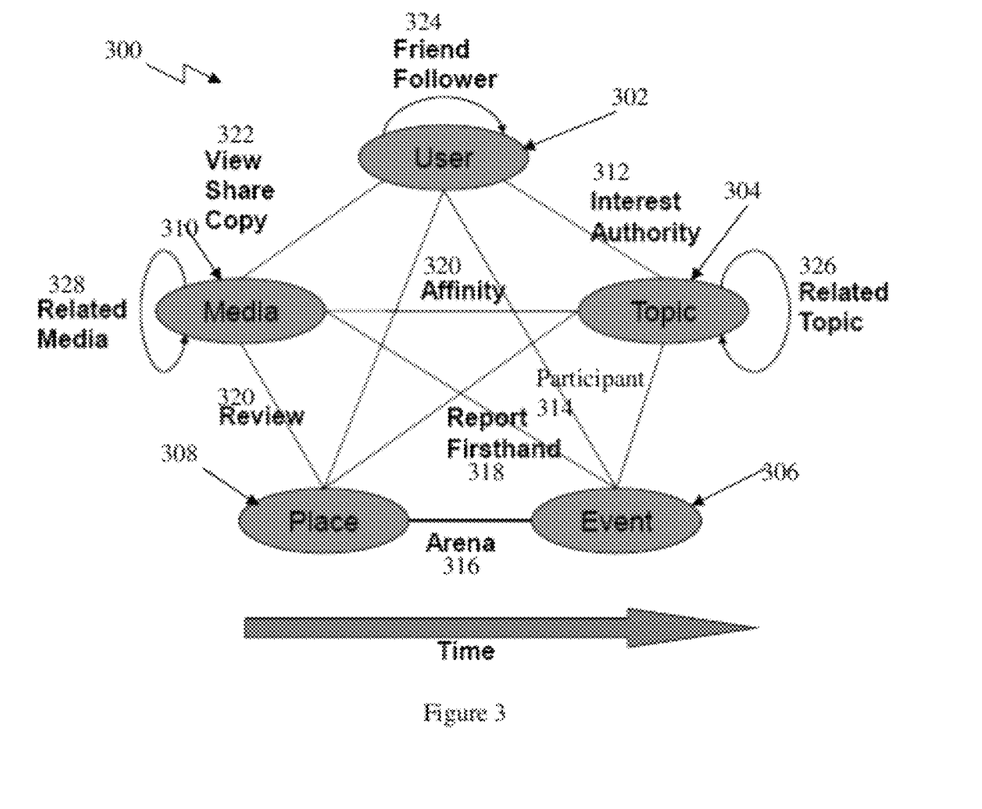
FIG. 3 depicts an exemplary data structure for aggregating and storing connections between social elements, according to the present disclosure.

With reference to FIG. 3, an exemplary representation of a data structure 300 for aggregating and storing connections between social elements is depicted, the data structure 300 includes a plurality of nodes representing exemplary categories of social elements including user 302, topic 304, event 306, place 308 and media 310, and a plurality of labeled connections between the nodes 310, including connections representing a user's 302 interest or authority 312 in a topic 304, a user 302 being a participant 314 in an event 306, a place 308 being an arena 316 for an event, a media 310 being a first hand report 318 on an event 306, a media 310 being a review 320 of a place 308, a media 310 being viewed shared or copied 322 by a user 302, a user 302 being a friend or follower 324 of another user 302, a topic 304 being related 326 to another topic 304, and a media 310 being related 328 to another media 310. The collection of social element nodes and connections over a time window, for example, a rolling time window, may be collectively referred to as the social genome.

As noted above, the data structure 300 may be visually represented to a user as a multi-graph. A user may advantageously view the multigraph through a plurality of views including a high level view of all connections and nodes or a zoom view of a particular instance of a social element (such as depicted in FIGS. 4 and 5).

Figure 4:
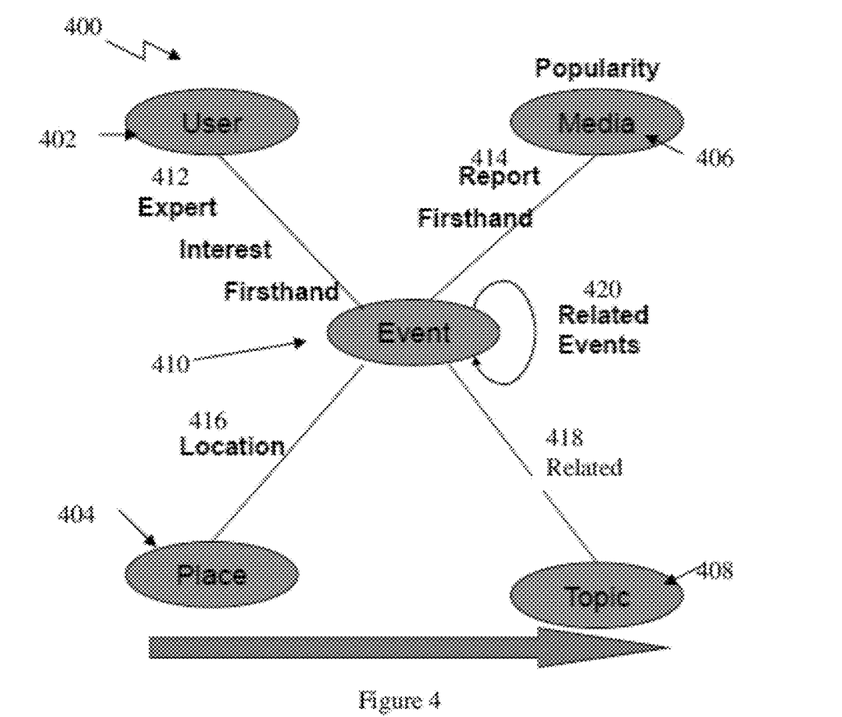
FIG. 4 depicts an event-centric view of a multi-graph, according to the present disclosure.

Referring to FIG. 4, an exemplary event-centric view 400 a multigraph is depicted. In general, an event 410 is placed in the center and relevant connections between the event 410 and other social elements are depicted. For example, event 410 may be connected relative to one or more users 402 places 404, media 406, topics 408 and other events. Connections may include, for example, a user 402 being an expert of, having an interest in, or having first hand experience with 412 the event 410, a media 406 including a first hand report 414 of the event 410, a topic 408 being related 418 to the event 410, a place 404 being a location 416 for an event, and even an second event being related to the event 410.

Figure 5:
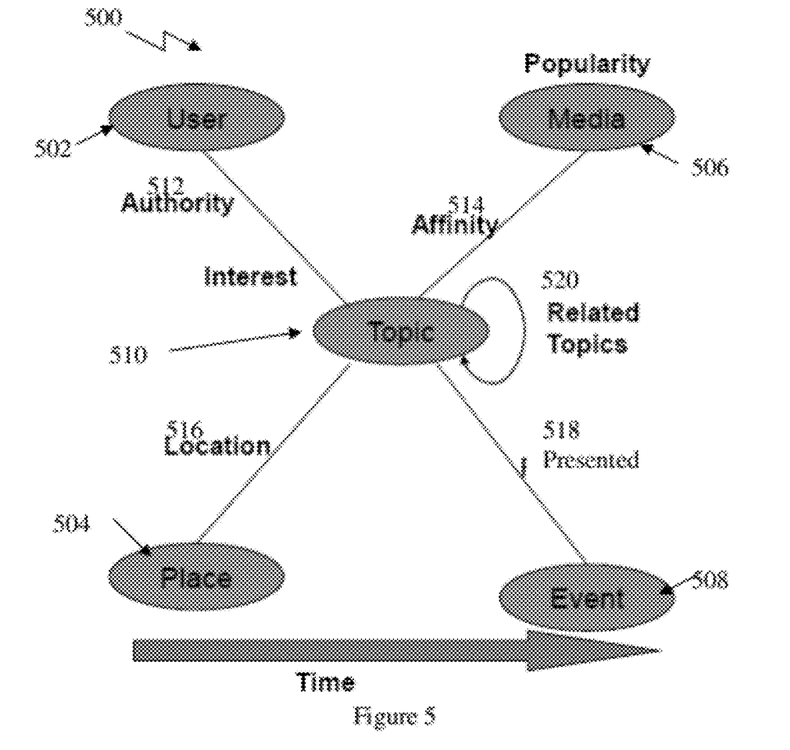
FIG. 5 depicts a topic-centric view of a multi-graph, according to the present disclosure.

Referring to FIG. 5, an exemplary topic-centric view 500 of a multigraph is depicted. In general, an event 510 is placed in the center and relevant connections between the event 510 and other social elements are depicted. For example, event 410 may be connected relative to one or more users 502, placed 504, media 506 or events 508. Connections may include, for example, a user 502 being an authority on, having an interest in 512 the topic 510, a media 506 expressing an affinity for the topic 510, a place 504 being a location 516 for the topic 510, the topic 510 being presented 518 at an event 508, and the topic 510 being related to another topic.

It is noted that zoom views are note limited to event-centric and/or topic-centric view. Indeed, any type of social element may be investigated via a zoom view.

In exemplary embodiments, the aggregation of connections over a rolling time window, may include calculating and storing a relative strength/importance for each connection, for example, based on the frequency, age, and/or credibility of the connection, or some other specified criteria. In exemplary embodiments, a filter may be applied, for example, to the time window or a subset thereof, such that only those connections of sufficient importance, are aggregated, stored or conveyed.

Thus, in exemplary embodiments, a filter may be applied to prevent aggregating and/or storing of connections that appear less than a threshold number of times in the data stream over the time window or a subset thereof.

In exemplary embodiments, semantic analysis may be used to determine, validate/confirm, evaluate or otherwise inform such connections. In some embodiments, semantic analysis may be used to identify and label a connection between social elements. For example, Semantic analysis may be used to determine a person's sentiment (such as dejifasusi's positive sentiment about Angelina Jolie and the movie Salt per the post in FIG. 1b or mikalgilmore's negative sentiment about tax cuts per the post in FIG. 1d). Semantic analysis may also be used to validate a previously established connection (for example, with reference to the post in FIG. 1d, semantic analysis of the New York Times story may serve to confirm the negative sentiment connection between mikalgilmore and tax cuts).

Figure 6:
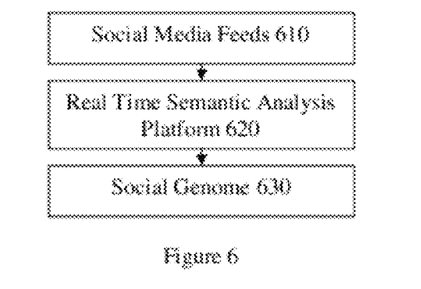
FIG. 6 depicts an implementation of a semantic analysis platform, according the present disclosure.
Figure 7:
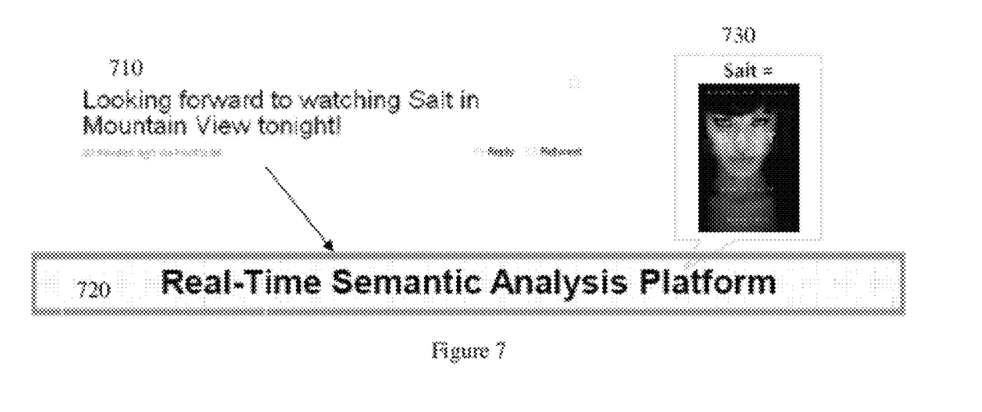
FIG. 7 depicts ambiguity resolution using a semantic analysis platform, according to the present disclosure.

With reference to FIG. 6, an exemplary implementation of a semantic analysis platform 620 is depicted. Semantic analysis platform 620 may advantageously be used for processing data from a plurality of data streams 610 in order to populate a social genome 630. In particular, the semantic analysis platform 620 may be used to discover, filter and/or analyze social elements and/or connections between social elements. In general, the semantic analysis engine may include a massive dynamic taxonomy (for example, 10M+ entries) for identifying and analyzing social element. In exemplary embodiments the semantic analysis platform may include modules, inter alia, for ambiguity resolution (see FIG. 7), event detection (for example, based detection of a time component associated with a social element), social reputation (for example, based on affinity language), data mining information extraction, natural language processing, spelling correction, synonym detection, and language detection. Referring to FIG. 7, an example of ambiguity resolution, is depicted e.g., wherein the semantic analysis engine 700 is able to infer from the context that the term Salt in post 710 is referring to a movie 720.

In exemplary embodiments a distributed architecture, such as Muppet (map, update), may be used to implement the systems and methods of the present disclosure. Exemplary implementations of Muppet are further described herein as well as in U.S. non-provisional patent application Ser. No. 13/300,524, entitled "Processing Data Feeds," filed Nov. 18, 2011. In general, a distributed architecture may include a mapper and one or more updaters, wherein the updaters are distributed between different processing nodes, for example, in a network. Thus the mapper may process each incoming post and map to one or more of the updaters for updating stored information based on new information extracted from the post. Information in a distributed architecture may be stored in a plurality of slates associated with the updater. For example, a slate may be mapped and updated for each combination of social elements identified.

As used herein, the terms "map" and "mapper" relate to a stream operation performed in exemplary embodiments in which posts in a data stream are processed in a real-time manner to generate one or more new posts which are then published to a same or different data stream. In exemplary embodiments, a mapper may be used to publish posts to one or more updaters for updating a corresponding slate.

As used herein, the terms "update" and "updater" refer to a stream operation performed in exemplary embodiments in which posts in one or more real-time data streams are processed in a real-time manner to create or update one or more persistent static "slate" data structures that are stored in a persistent manner in a durable disk storage. In some exemplary embodiments, an update operation may generate one or more new posts. The generated posts may be published to one or more real-time data streams. In an exemplary embodiments, an update operation may publish posts to a data stream from which it accepts posts as input.

As used herein, the term "slate" refers to a static data structure that may be used to record data about a set of one or more related posts. A slate may have any suitable data structure or format. In an exemplary format, a slate may include a collection of one or more labels, for example, attribute-value pairs. A slate may be stored corresponding to its unique slatekey attribute value and corresponding to an update operation that updates the slate.

It is explicitly contemplated that the systems and methods presented herein may include one or more programmable processing units having associated therewith executable instructions held on one or more computer readable medium, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included to convey detected/processed data, for example adjusted output representative of a particle characteristic. The display and/or other feedback means may be stand-alone or may be included as one or more components/modules of the processing unit(s). In exemplary embodiments, the display and/or other feedback means may be used to visualize the social genome, for example, a multi-graph representation of the social genome, as described herein.

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 8:
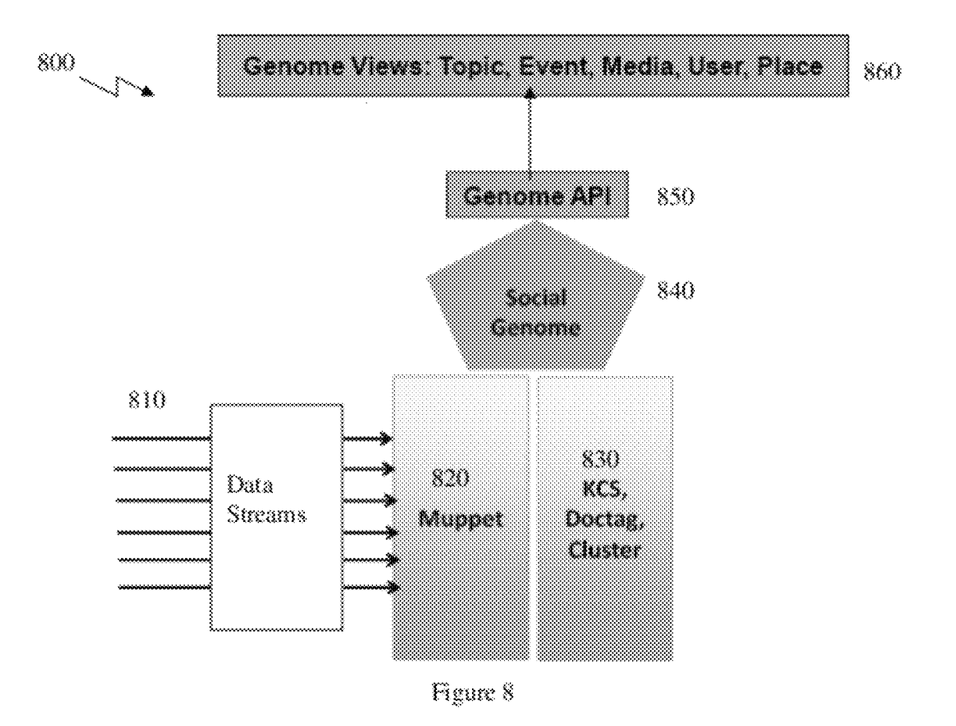
FIG. 8 depicts an exemplary system for processing streaming data, according to the present disclosure.

Referring to FIG. 8, an exemplary system 800 is depicted integrating a distributed architecture 820 and semantic analysis 830 for processing data streams 810 and populating a social genome 840, as described herein. System 800 further includes an API 850 enabling querying the social genome 840, for example, for isolating different views 860 thereof. It will be appreciated that API 850 may integrate with both native applications and third party applications.

Figure 9:
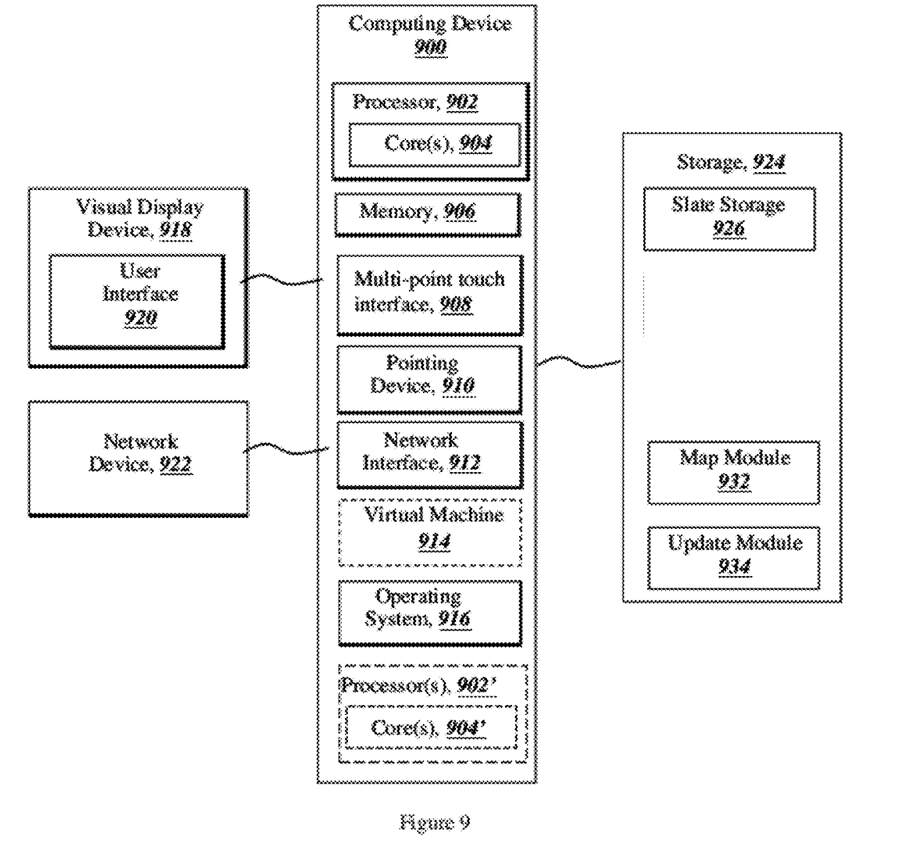
FIG. 9 depicts a computing device for implementing the systems and methods of the present disclosure.

FIG. 9 depicts a block diagram representing an exemplary computing device 900 that may be used as a processing node (also referred to as a worker node) for aggregating and/or storing data as described herein, for example a processing node in a distributed architecture as described herein. The computing device 900 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 900 includes one or more non-transitory computer-readable media having encoded thereon one or more computer-executable instructions or software for implementing exemplary methods. The non-transitory computer-readable media may include, but are not limited to, one or more types of hardware memory, non-transitory tangible media (for example, one or more magnetic storage disks, one or more optical disks, one or more USB flash drives), and the like. For example, memory 906 included in the computing device 900 may store computer-readable and computer-executable instructions or software for implementing exemplary embodiments. The computing device 900 also includes processor 902 and associated core 904, and in some embodiments, one or more additional processor(s) 902' and associated core(s) 904' (for example, in the case of computer systems having multiple processors/cores), for executing computer-readable and computer-executable instructions or software stored in the memory 906 and other programs for controlling system hardware. Processor 902 and processor(s) 902' may each be a single core processor or multiple core (904 and 904') processor.

Virtualization may be employed in the computing device 900 so that infrastructure and resources in the computing device may be shared dynamically. A virtual machine 914 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof. Memory 906 may be used to store one or more slates on a temporary basis, for example, in cache.

A user may interact with the computing device 900 through a visual display device 918, such as a screen or monitor, that may display one or more user interfaces 920 that may be provided in accordance with exemplary embodiments. The visual display device 918 may also display other aspects, elements and/or information or data associated with exemplary embodiments. The computing device 900 may include other I/O devices for receiving input from a user, for example, a keyboard or any suitable multi-point touch interface 908, a pointing device 910 (e.g., a mouse, a user's finger interfacing directly with a display device, etc.). The keyboard 908 and the pointing device 910 may be coupled to the visual display device 918. The computing device 900 may include other suitable conventional I/O peripherals.

The computing device 900 may include one or more audio input devices 924, such as one or more microphones, that may be used by a user to provide one or more audio input streams.

The computing device 900 may include one or more storage devices 924, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. For example, the storage device 924 may provide a slate storage 926 for storing data related to the social genome data structure as described herein, for example with reference FIG. 3. The storage device 924 may further provide one or more map modules 932 and update modules 934 for implementing a distributed architecture for processing a data stream and updating slates in the slate storage 926. The storage device 924 may be provided on the computing device 900 or provided separately or remotely from the computing device 900. The storage device 924 may be used to store one or more slates in a durable manner.

Exemplary mappers and updaters may be programmatically implemented by a computer process in any suitable programming language, for example, a scripting programming language, an object-oriented programming language (e.g., Java), and the like. In an exemplary object-oriented implementation, a general Mapper class or interface and Updater class or interface may be defined by the system to generally specify attributes and functionality of a generic update operation. For each desired update operation, a subclass may be created based on the Updater class. For example, a Connection class may be sub-classed from the Updater class to define an update operation that processes a data stream and determines one or more attribute-value pairs (e.g., affinity, authority, interest and the like) representing a connection between social elements associated posts in the data stream. The Connection operation may subscribe to the data stream and may publish posts to a separate data stream, each published post including an identified tuple of social elements and the determined set of attribute-value pairs characterizing the connection between the social elements in the tuple. One or more object instances may be created from each sub-class at a processor node, for example, a Connection object may be instantiated from the Connection class.

The computing device 900 may include a network interface 912 configured to interface via one or more network devices 922 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 912 may include a built-in network adapter, network interface card, PCMCIA network card, card bus network adapter, wireless network adapter, USB network adapter, modem or any other device suitable for interfacing the computing device 900 to any type of network capable of communication and performing the operations described herein. The network device 922 may include one or more suitable devices for receiving and transmitting communications over the network including, but not limited to, one or more receivers, one or more transmitters, one or more transceivers, one or more antennae, and the like.

The computing device 900 may run any operating system 916, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 916 may be run in native mode or emulated mode. In an exemplary embodiment, the operating system 916 may be run on one or more cloud machine instances.

Figure 10:
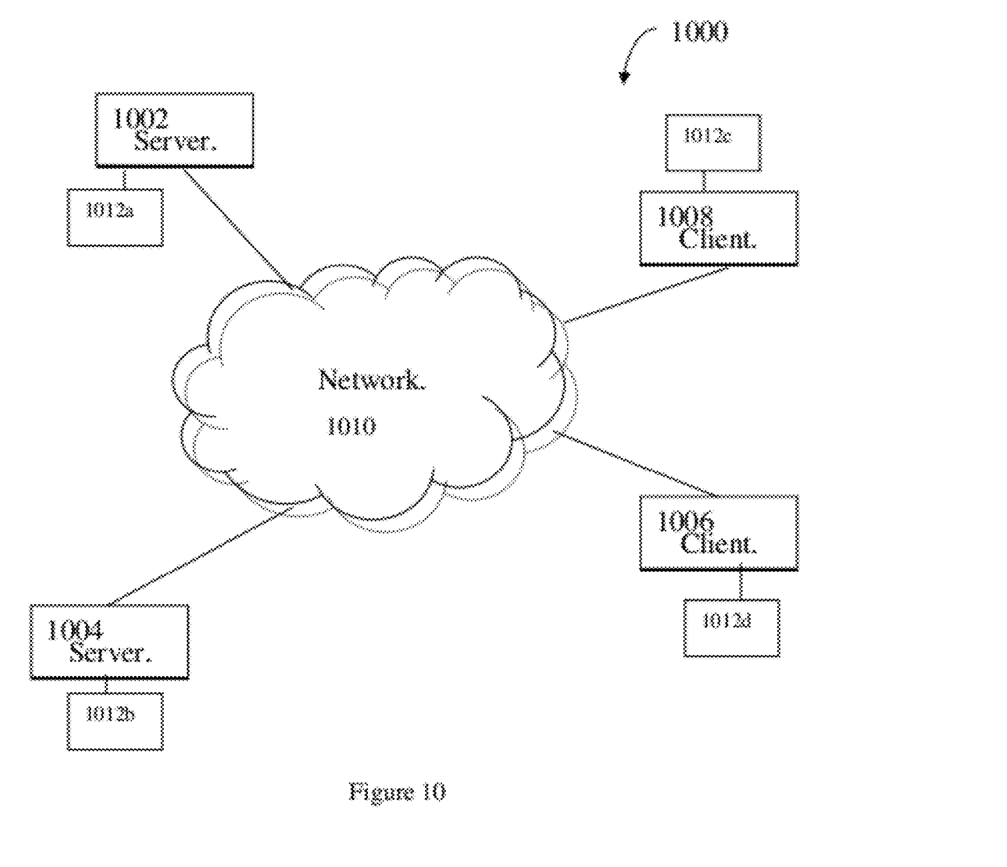
FIG. 10 depicts a network environment for implementing the systems and methods of the present disclosure.

FIG. 10 depicts an exemplary network environment 1000 suitable for a distributed implementation of exemplary embodiments. The network environment 1000 may include one or more servers 1002 and 1004 coupled to one or more clients 1006 and 1008 via a communication network 1010. The network interface 912 and the network device 922 of the computing device 900 enable the servers 1002 and 1004 to communicate with the clients 1006 and 1008 via the communication network 1010. The communication network 1010 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1010 are capable of supporting distributed implementations of exemplary embodiments.

In an exemplary embodiment, the servers 1002 and 1004 may provide the clients 1006 and 1008 with computer-readable and/or computer-executable components or products under a particular condition, such as a license agreement. In some exemplary embodiments, the computer-readable and/or computer-executable components or products provided by the servers may include those for providing one or more real-time data streams to worker processes at worker nodes. The clients 1006 and 1008 may process the data streams using the computer-readable and/or computer-executable components and products provided by the servers 1002 and 1004. In some exemplary embodiments, the computer-readable and/or computer-executable components or products provided by the servers may include those for providing and executing one or more map and/or update operations. The clients 1006 and 1008 may execute the map and update operations using the computer-readable and/or computer-executable components and products provided by the servers 1002 and 1004. In some exemplary embodiments, the clients 1006 and 1008 may transmit posts generated by update operations to the servers 1002 and 1004 for publication in one or more data streams. In some exemplary embodiments, the clients 1006 and 1008 may transmit one or more slates created or updated by update operations to the servers 1002 and 1004 for persistent storage on a disk storage or for storage in memory, e.g., in cache.

Alternatively, in another exemplary embodiment, the clients 1006 and 1008 may provide the servers 1002 and 1004 with computer-readable and computer-executable components or products under a particular condition, such as a license agreement. In some exemplary embodiments, the computer-readable and/or computer-executable components or products provided by the clients may include those for providing one or more real-time data streams to worker processes. The servers 1002 and 1006 may process the data streams using the computer-readable and/or computer-executable components and products provided by the clients 1006 and 1008. In some exemplary embodiments, the computer-readable and/or computer-executable components or products provided by the clients may include those for providing and executing one or more map and/or update operations. The servers 1002 and 1004 may execute the map and update operations using the computer-readable and/or computer-executable components and products provided by the clients 1006 and 1008. In some exemplary embodiments, the servers 1002 and 1004 may transmit posts generated by update operations to the clients 1006 and 1008 for publication in one or more data streams. In some exemplary embodiments, the servers 1002 and 1004 may transmit one or more slates created or updated by update operations to the clients 1006 and 1008 for persistent storage on a disk storage or for storage in memory, e.g., in cache.

In exemplary embodiments one or more mappers and one or more updaters for example map module 932 and update module 934 of FIG. 9, may be distributed to throughout various processing nodes of the network environment 1000, for example nodes 1012*a-d*.

Although the teachings herein have been described with reference to exemplary embodiments and implementations thereof, the disclosed systems, methods and non-transitory storage medium are not limited to such exemplary embodiments/implementations. Rather, as will be readily apparent to persons skilled in the art from the description taught herein, the disclosed systems and methods are susceptible to modifications, alterations and enhancements without departing from the spirit or scope hereof. Accordingly, all such modifications, alterations and enhancements within the scope hereof are encompassed herein.

What is claimed:

1. A system for processing streaming data, the system comprising:
   processing nodes on computing hardware in a distributed architecture;
   at least one semantic analysis engine operable on at least one processing node to apply natural language processing techniques to:
      characterize text from a social media post as attribute-value pairs:
      characterize a subset of the attribute-value pairs as describing one of:
         a node in a graph of nodes and edges representative of relationships in social media content in a data stream; or
         a connection serving as an edge of the edges between the nodes in the graph;
   a mapper at a processing node operable to publish an attribute-value pair of the attribute-value pairs, an attribute of the attribute-value pair comprising a stream ID and a value of the attribute-value pair comprising a set of the attribute-value pairs, to an intermediate data stream identified by the stream ID; and
   an updater at a processing node storing information in memory about the graph over a rolling time window, subscribing to the intermediate data stream, and operable to update the information about the graph in real time with information from the set of the attribute-value pairs.

2. The system of claim 1, further comprising a filter operable to prevent storing of connections that appear less than a threshold number of times in the data stream over a portion of the rolling time window.

3. The system of claim 1, further comprising an application program interface enabling querying of stored nodes and connections.

4. The system of claim 1 wherein the memory comprises a set of slates maintaining data structures with the attribute-value pairs describing nodes and connections and corresponding occurrences in the data stream.

5. The system of claim 1, wherein the semantic analysis engine is further operable to characterize a node as a type comprising one or more of (i) people, (ii) places, (iii) things, (iv) media, (v) events, or (vi) products.

6. The system of claim 1, wherein the semantic analysis engine is further operable to characterize connections as one or more of (i) an asymmetric relationship, (ii) an affinity rating, or (iii) an authority rating.

7. The system of claim 1, wherein the data stream is an unstructured data stream relative to connections embodied therein.

8. The system of claim 1, wherein the rolling time window is operable to remove older connections from the graph and add new connections in real time.

9. A data structure embodied in a non-transitory computer readable storage medium, for capturing and aggregating social information from streaming data, the data structure comprising:
   a plurality of stored nodes and connections between nodes in a graph of nodes and edges representative of relationships identified over a rolling time window in social media content in a data stream;
   the plurality of stored nodes and connections updated in real time by at least one updater, the at least one updater subscribing to at least one intermediate data stream from at least one mapper publishing attribute-value pairs with information about the plurality of stored nodes and connections to the at least one intermediate data stream; and
   the plurality of stored nodes and connections identified by at least one semantic analysis engine in communication with the at least one mapper, the at least one semantic analysis engine operable to apply natural language processing techniques to:
      characterize text from a social media post as the attribute-value pairs:
      characterize subsets of the attribute-value pairs as describing one of:
         a node in the graph of the nodes and the edges representative of relationships in the social media content in the data stream; or
         a connection serving as an edge between the nodes in the graph.

10. The data structure of claim 9, wherein the data structure is altered by the rolling time window operable to remove older nodes and connections from the data structure that have not recently been updated and to add new nodes and connections with information provided by the at least one updater.

11. The data structure of claim 9, wherein the nodes are further characterized in the data structure as one or more of (i) people, (ii) places, (iii) things, (iv) media, (v) events, or (vi) products.

12. The data structure of claim 9, wherein the connections are further characterized in the data structure as one or more of (i) an asymmetric relationship, (ii) an affinity rating, or (iii) an authority rating.

13. The data structure of claim 9, wherein the data stream is an unstructured data stream relative to the connections embodied therein.

14. A system for analyzing social information, the system comprising:
   multiple processors and multiple memory devices in data communication with the processors deployed in a distributed architecture, the multiple memory devices storing executable code for implementing:
at least one semantic analysis engine operable to apply natural language processing techniques to:
identify attribute-value pairs in text in a data stream; and
identify subsets of the attribute-value pairs as describing nodes and
connections between nodes in a graph of nodes and edges representative of relationships in social media content in the data stream;
at least one mapper operable to publish the attribute-value pairs, a pair of the attribute-value pairs having an attribute comprising a stream ID and a value comprising a subset of the attribute-value pairs from the at least one semantic analysis engine, to an intermediate stream identified by the stream ID;
at least one updater at a processing node updating information relevant to a data structure, the data structure having a plurality of stored nodes representing discovered social elements including at least a first node, a second node, and a third node; and a plurality of stored connections between nodes representing contextual connections discovered between the nodes; and
an interface for querying of the plurality of stored nodes and the plurality of stored connections, wherein the first node is a user and the second and third nodes represent entities referenced in social media content authored by the user;
wherein the plurality of stored connections further include a first connection type for the first node to the second node, a second connection type for the first node to the third node, the first and second connection types being different; and
wherein the plurality of stored connections further include a third connection type between the second node and the third node, the third connection type being different from the first and second connection types.

15. The system of claim 14, wherein the interface is used to display a labeled edge multi-graph representing the data structure.

16. The system of claim 14, wherein the interface is used to query the data structure for connections related to a particular node.

17. The system of claim 16, wherein the interface is used to display an instance-centric view of a multigraph.

18. A method for capturing data from a plurality of data streams in real time, the method comprising:
engaging in natural language processing on text from the plurality of data streams from multiple different social media services in real time to characterize text from social media posts in the plurality of data streams as attribute-value pairs;
characterizing subsets of the attribute-value pairs as describing nodes and connections between one or more nodes represented in the text of the social media posts in the plurality of data streams;
publishing, by a mapper, an attribute-value pair of the attribute-value pairs, an attribute of the attribute-value pair comprising a stream ID and a value of the attribute-value pair comprising the subsets of the attribute-value pairs, to an intermediate data stream identified by the stream ID; and
updating, by an updater subscribing to the intermediate data stream, information about a graph of the nodes and the connections with information from the subsets of the attribute-value pairs stored in a distributed data structure over a rolling time window,
wherein characterizing the subsets of the attribute-value pairs as describing the nodes and the connections includes characterizing different types of the nodes and different types of the connections.

19. The method of claim 18, further comprising querying the data for the connections related to a particular instance of a node of the one or more nodes.

20. The method of claim 18, further comprising displaying an instance-centric view of a multi graph for a particular node.

21. A non-transitory computer readable storage medium storing processor executable instructions for capturing data from a plurality of data streams in real time, including instructions for:
engaging in natural language processing on text from the plurality of data streams from multiple different social media services in real time, at a first set of processing nodes, to characterize text from social media posts in the plurality of data streams as sets of attribute-value pairs with information about nodes and connections in a graph of the nodes and edges representative of relationships in social media content in the plurality of data streams;
publishing, by at least one mapper, the attribute-value pairs, the attribute-value pairs having attributes comprising stream ID and values comprising the sets of the attribute-value pairs with information about the nodes and the connections, to intermediate data streams identified by the stream IDs; and
updating, by at least one updater subscribing to the intermediate data streams, information about the graph of the nodes and the edges with information from the sets of the attribute-value pairs stored in a distributed data structure over a rolling time window.

* * * * *